(No Model.)
I. A. THOMAS.
HOE FOR CHOPPING COTTON.
No. 355,801. Patented Jan. 11, 1887.
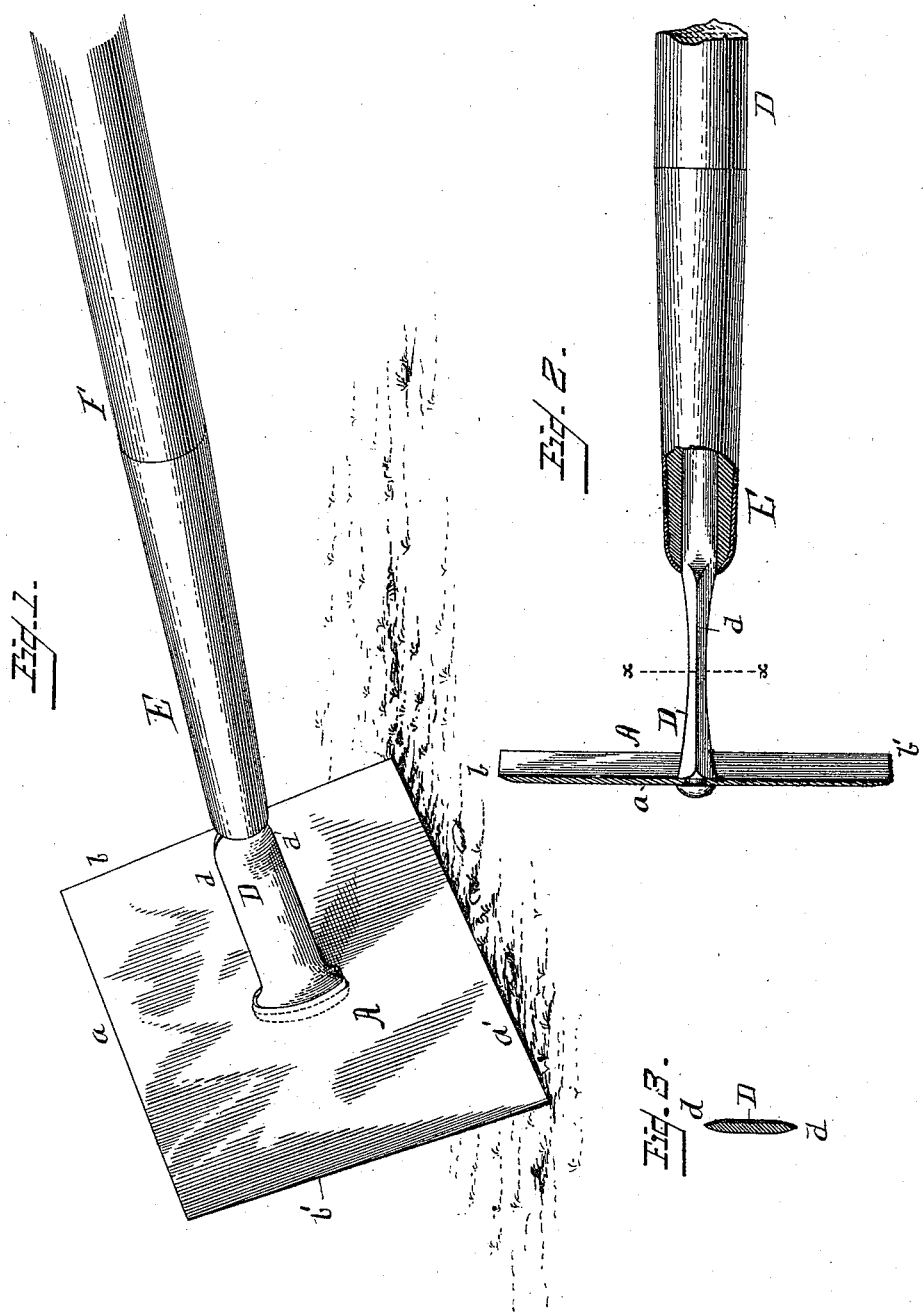
Witnesses
Inventor
Ira A. Thomas
By his Attorneys

UNITED STATES PATENT OFFICE.

IRA A. THOMAS, OF CHERRY VALLEY, ASSIGNOR OF ONE-HALF TO GEORGE B. CHADWICK, OF RIVERSIDE, ARKANSAS.

HOE FOR CHOPPING COTTON.

SPECIFICATION forming part of Letters Patent No. 355,801, dated January 11, 1887.

Application filed November 25, 1884. Serial No. 148,824. (No model.)

*To all whom it may concern:*

Be it known that I, IRA A. THOMAS, of Cherry Valley, in the county of Cross and State of Arkansas, have invented certain new and useful Improvements in Hoes for Chopping Cotton by Hand and for other Purposes, of which the following is a full, clear, and exact description.

My invention relates to hoes for chopping cotton; and it consists in a blade sharpened on its edges and united to a shank beveled on opposite sides so as to form knife-edges, whereby the blade and shank will present a cutting-edge, whichever side is used. The construction is more particularly shown in the accompanying drawings, in which—

Figure 1 is a perspective view of the hoe; Fig. 2, a top plan view, partly in section, of same; and Fig. 3, a section of the shank on line $x\ x$, Fig. 2.

The blade A is rectangular in form, and each side is sharpened to form a cutting-edge, $a\ a'\ b\ b'$. The blade is suitably attached to a shank, B, at or near its center, as shown in Figs. 1 and 2. This shank is set obliquely to the plane of the blade, so as to constantly bring the blade at an angle to the ground when in use. The shank D is flattened on its sides, and beveled, so as to form cutting-edges $d$, the object of which will be hereinafter explained. The shank is secured to the handle F by the ordinary means of a tang and thimble, E. By this form of construction it will be seen that the operator can use either edge $a\ a'$ or $b\ b'$ of the blade, and at the same time have a cutting-edge of the shank in line or in direction of the cutting-edge of the blade; or by simply turning the handle or blade to the right or left the operator can use the edge $b$ or $b'$ and still have an edge of the shank as a cutting-edge. Thus the operator, by simply turning the handle, may reverse the cutting-edge of the hoe to remove surplus cotton, weeds, or grass from opposite sides of a cotton-row without danger of pushing the remaining plants down or out of the ground, and without moving to opposite sides of a row he can use the hoe toward him on one side and away from him on the other side, and thus always have his work in plain view. The shank D being sharpened and flattened, as described, assists in cutting through crab-grass, indigenous to cotton-growing lands, and the instrument when used in wet and mossy ground is less liable to clog.

Having thus described my invention, what I claim as new, and desire to secure by Letters Patent, is—

A hoe consisting of a plate provided with cutting-edges, as described, and a shank inclined to the face of the plate and having flattened sides and beveled cutting-edges, as and for the purpose set forth.

IRA A. THOMAS.

Witnesses:
W. O. MITCHELL,
F. J. KIMBELL.